United States Patent [19]

Wanzenberg et al.

[11] 4,177,064
[45] Dec. 4, 1979

[54] METAL RECOVERY PROCESS AND METHOD

[76] Inventors: Fritz W. Wanzenberg; Frederick W. Wanzenberg; Andrew K. Wanzenberg, all of 9 Campbell La., Larchmont, N.Y. 10538

[21] Appl. No.: 783,846

[22] Filed: Apr. 9, 1977

[51] Int. Cl.$^2$ ............................................. C22B 11/00
[52] U.S. Cl. ..................................... 75/83; 208/11 R
[58] Field of Search ......................... 75/83; 208/11 R

[56] References Cited

U.S. PATENT DOCUMENTS

| 3,383,201 | 5/1968 | Petty | 75/83 |
| 3,979,205 | 9/1976 | Wanzenberg | 75/83 |

*Primary Examiner*—M. J. Andrews

[57] ABSTRACT

A method of treating a composite material such as oil shale or low grade coal to recover metals, metal compounds and additional heat. The method comprises reducing the particle size of said composite material, separating the composite organic portion from the gangue portion which forms a part of the material to form a composite metal-containing organic concentrate. The concentrate is then treated with available oxygen-bearing materials in wet solution in an amount sufficient to supply all or a portion of the stoichiometric amount of oxygen required for combustion of the concentrate. Then or thereafter, the treated concentrate is treated with additional gas phase oxygen in an amount sufficient to make up the remainder if any of the stoichiometric amount of oxygen, thereby producing a treated composite organic material with or without other forms of oxygen. This treated composite organic material is further heated until the material ignites. Complete combustion of the organic material is allowed to take place, and the metal and metal oxides resulting from the combustion process are recovered by known methods. The heat generated by combustion may be used to pyrolyze additional amounts of shale by known methods.

In the most advanced modes of this invention, pressures on the oder of several hundred bar and particle temperatures on the order of 4500° C. can be used in a combined combustion-pyrolysis-synthesis to recover vapor phase minerals and oil from the pyrolysis of shale, with the additional capability of cracking the oil into lighter hydrocarbons and/or the production of useful synthesis products. This method reduces total energy consumption, produces a range of useful finished products, provides for greater recovery from the shale and renders all ash and effluents ecologically safe.

9 Claims, 5 Drawing Figures

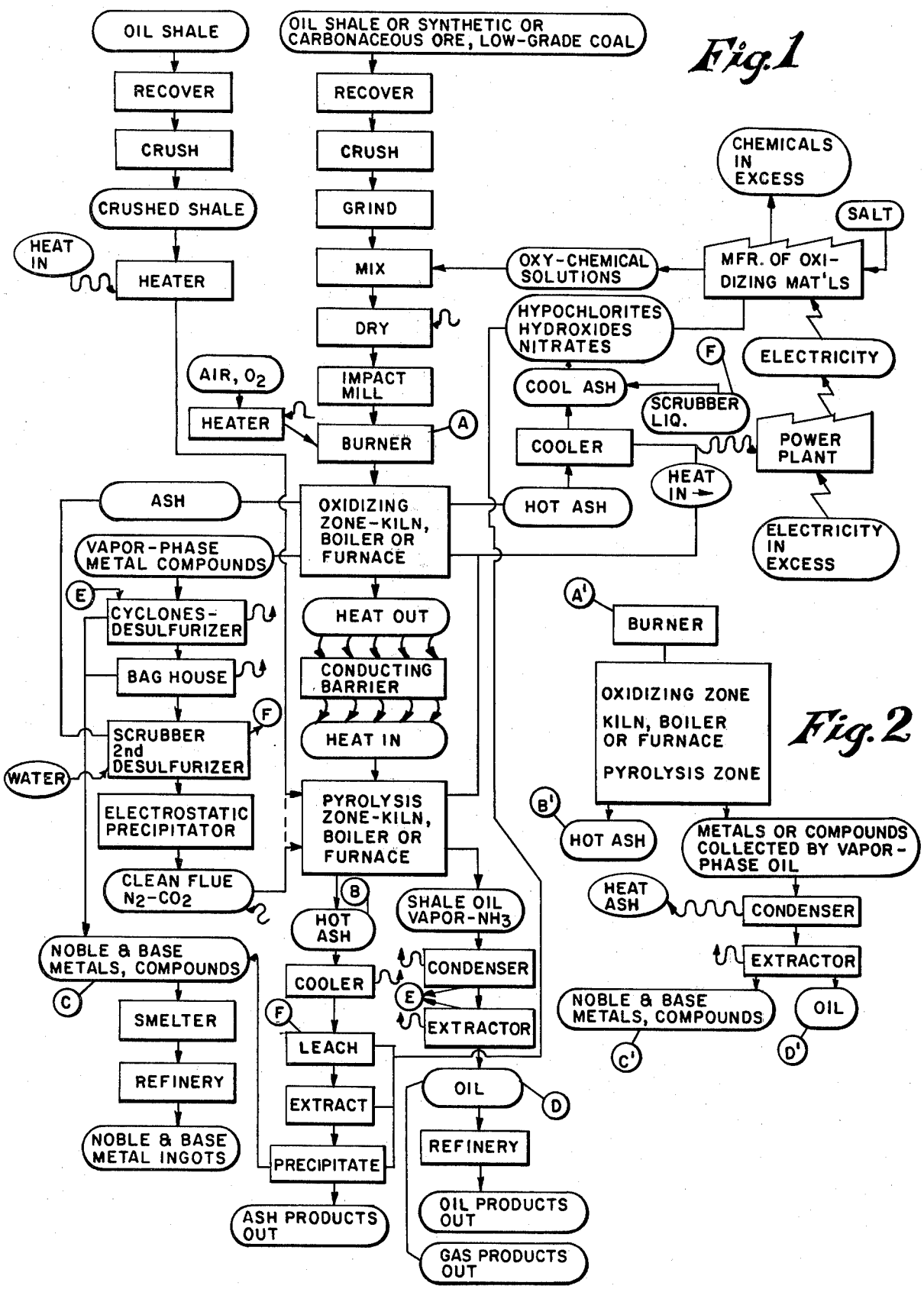

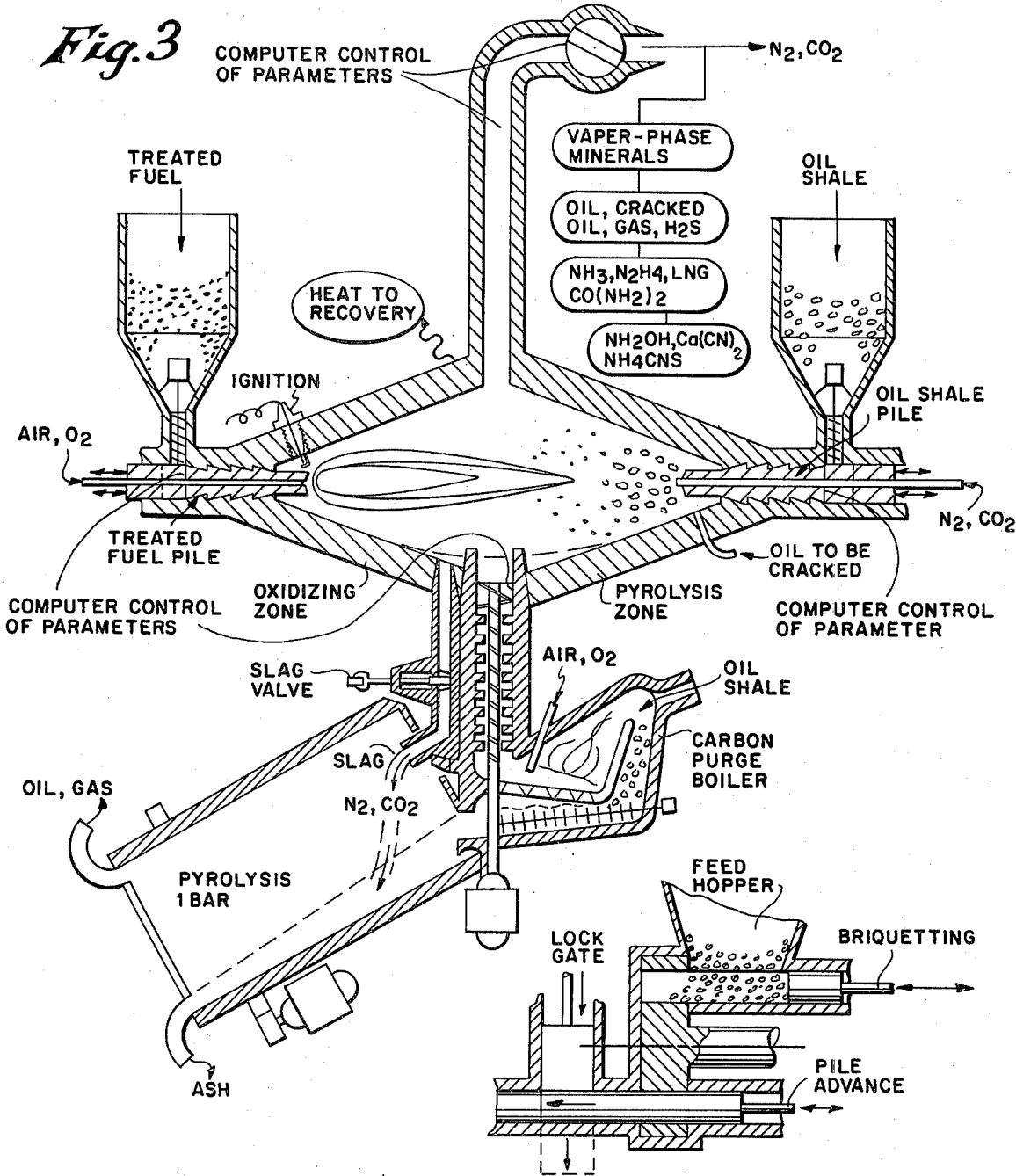

METAL RECOVERY PROCESS AND METHOD

BACKGROUND OF THE INVENTION

The present invention relates generally to metal recovery methods and, more particularly, to the recovery of metal from oil shale and like materials. In another aspect, the invention relates to the treatment of oil shale in a manner such that metal values are recovered from one portion of shale starting material and the excess heat generated in the production of metal values from this portion of the shale is used for pyrolysis of the other portion of shale starting material for oil recovery therefrom.

The present invention represents an improvement, and in a certain respect, a variation of the methods of metal recovery which are described in U.S. Pat. Nos. 3,979,205 and 3,819,363. The method of the invention can be advantageously combined with known processes of oil shale pyrolysis.

As set forth in the patents referred to above, various carbonaceous land and sea ores are treated by various processes, all of which included the steps of treating the ore material with oxidizing and/or oxidizing and reducing agents, and then permitting the oxidized materials to ignite spontaneously to form a fine ash product. Metal values were recovered from the vapor phase of this process, or from the ash collected therefrom, or both.

According to the present invention, the starting material, instead of the type of carbonaceous ore referred to in the above patents, is oil shale, typically, Saskatchewan or Colorado oil shale. According to the invention, the oil shale serves as a starting material and furnishes metal values as well as most or all of the additional fuel and chemical products required to conduct the separation process. In one form of the invention, the shale is retorted indirectly and in the other form the shale is directly retorted. The process can be accomplished with no damage to the environment.

In view of the desire to obtain new and improved chemical processes and methods, particularly those which can be carried out in a manner compatible with the environment, and in view of the need to utilize abundantly available natural resources and to avoid depleting scarce resources, it is an object of the present invention to provide an improved metal recovery process.

Another object is to provide a metal recovery method wherein oil shale or other similar materials are used as the starting products in the process.

Another object is to provide a method of treating oil shale in which one portion of a mass of shale selected for treatment is exposed to a metal recovery method and wherein the other portion of the selected mass of material is pyrolyzed in a known manner, and in which the excess heat generated in the metal recovery portion of the process is used to aid in the recovery of oil by the pyrolysis method.

Yet another object is to provide a metal recovery method wherein the metals are recovered from a vapor phase which is produced by the combustion of treated oil shale or like products.

Still another object is to provide a method for recovering metal and other products from the solid phase ash produced by pyrolyzing or retorting oil shale or like products.

Still another object is to provide for recovery of alkalies and alkaline earth metal oxides during treatment of oil shale.

It is still a further object of the invention to remove sulfur compounds from the products of shale combustion by the use of materials derived from the shale or other starting materials.

Another object of the invention is to provide a method which makes optimum use of nitric and hydrochloric acids which are generated during the combustion process and to make use of the alakall and alkaline earth hydroxides generated in one portion of the process to form oxidizing agents which are used in other portions of the process.

A still further object is to provide a method wherein oxygen-containing chemicals and atmospheric oxygen are used to cause an exceedingly rapid rate of treated shale combustion with the production of great amounts of heat in order to drive the metals sought to be recovered into a vapor phase, and at the same time, to have extra heat available for use in associated chemical processes.

It is an object of this invention to operate either or both the oxidizing and pyrolysis chambers at extremely high temperatures and pressures, with continuous or batch feed, to produce high temperature - high pressure chemistry, very high combustion and production rates. Outputs in addition to vapor phase metal values and oil vapor include a full range of cracked oil products; synthesis products, such as SNG and other gases; ammonia and ammonia derivative products such as hydroxylamine, hydrazene, urea, thiourea, cynamide and guanidine; ash and heat.

It is an object of this invention to use added catalysts for the production of ammonia and ammonia-type products, and to crack the oil into its fractions, using added or autogenous natural catalytic agents under conditions of high temperatures and pressures.

The foregoing and other objects of the invention are achieved in practice by recovering oil shale or the like, reducing it to appropriate particle size, burning the shale or like material in the presence of oxygen containing compounds and air, separating the combustion products into an ash phase and a vapor phase which contains metal, subsequently treating both the vapor and solid ash phases for recovery of metals therefrom, and utilizing portions of the heat derived from the oxidation process to pyrolyze additional shale for recovery of oil therefrom. The invention also contemplates recovering some metal values from the solid pyrolysis products of shale, and using vapor phase oil from pyrolysis to oil in the collection of metals or metal compounds.

The exact manner in which the foregoing objects are carried into practice will become more clearly apparent when reference is made to the following detailed description of the preferred embodiments of the invention, set forth by way of example and shown in the accompanying drawings.

BRIEF DESCRIPTION OF THE DRAWINGS

FIG. 1 is a diagrammatic view, in block form, showing the indirect pyrolysis method of treating a starting material such as oil shale in accordance with the invention; and FIG. 2 is a fragmentary diagrammatic view, in block form, showing certain steps of an alternate or direct-pyrolysis method of the invention.

FIGS. 3, 4, 5 are fragmentary diagrammatic views showing retort methods for oxidation, pyralysis, cracking and synthesis.

DESCRIPTION OF THE PREFERRED EMBODIMENTS OF THE INVENTION

While the block diagrams contained in the drawings generally speak for themselves, brief summary of the operation of the process shown in FIGS. 1–5 will be set forth, following which various examples will be given concerning the materials and conditions used in the process. As used herein, the expression "my patents" or "the patents", etc., means U.S. Pat. Nos. 3,979,205 and 3,819,363.

FIG. 1 generally shows the process to comprise a method of treating oil shale by the known pyrolysis method, while at the same time treating oil shale ore and similar material by the methods generally described in the patents referred to above. According to the invention, a number of features are provided. These include the use of heat generated in recovering metal values from the shale to aid in pyrolyzing the other portion of the shale.

Another feature consists of using by-products of the oxidation process to make up processes chemicals including those used in oxidation. Some of the excess heat is used to generate electricity used in making the oxidizing chemicals and any extra electricity thus generated may be used elsewhere.

Another feature of the invention is the treatment of certain incidental products of shale pyrolysis to remove metal values from them, and another feature includes removing sulfur from the vapor phase products of shale pyrolysis. FIG. 1 also shows that the solid phase or ash products can be treated to remove a number of metal oxides for metal recovery and that other metal oxides can be used to produce hydroxides for conversion to the oxidizing agents referred to above.

In FIG. 1 the letters (A)–(F) show steps or process phases having counterparts in FIG. 2.

DIRECT RETORT METHOD OF PYROLYSIS

FIG. 2 shows a direct pyrolysis method wherein the first steps are those shown in FIG. 1. The steps below stage A are different insofar as the shale is oxidized and pyrolyzed in the same area. The recovery of values is somewhat different. However, the hot ashes at (B') in FIG. 2 are treated as shown in FIG. 1 after removal from the pyrolysis zone. The oil shown at (D') is treated as at (D) in FIG. 1. The noble and base metals and compounds shown at (C') in FIG. 2 are treated as shown at (C) in FIG. 1.

FIG. 2 is a flow diagram of those process components or elements which differ from the indirect retort methods of pyrolysis shown in FIG. 1. All common technology process elements are shown by connecting symbols (A'), (A), etc. where both embodiments use common process elements so denoted.

Here the gaseous, liquid and solid products out of the oxidizing zone, and the heat they contain, are transferred continuously and directly into the pyrolysis zone. The hot ash is leached of its metal content as before while its heat is recycled, etc.

Here, however, vapor-phase metals and metal compound flue products are essentially collected by the oil. The condenser separates some heat and the flue gases from the oil mixture. The extractor separates the oil and liquids from the oil-vapor and flue-borne solids. The collected oil is sent to the refinery while the solids proceed to the smelter-refinery for recovery of noble and base metals.

Here, with a common oxidizing-pyrolysis chamber, the products directed from the oxidizing zone into the pyrolysis zone include vapor-phase metals and/or metal compounds, some ammonia and ammonia derivatives, chlorine, nitrogen oxides, etc., and hot ash. These products proceed directly into the pyrolysis zone wherein crushed oil shale is fed. As the shale completes pyrolysis at about 1000° F. (531° C.), the products of pyrolysis enter the flue stream; these include oil in vapor phase which acts as carrier for the vapor-phase metals out of combustion; and, depending upon temperature, pressure and natural or inserted catalysts: may contain cracked components of the oil, ammonia and derivative products comprising $N_2$, nitrogen oxides, hydrogen and oxygen, free or in chemical combinations.

FIG. 3 is a flow diagram of those process components which differ from the indirect and direct retort methods of pyrolysis shown in FIGS. 1 and 2.

In a reaction chamber, high particle temperatures and pressures are supported by extremely high reaction rates and controlled by feed and discharge to cause cracking of hydrocarbonaceous non-fuel inputs and the formation of useful chemicals.

Fuel is treated with oxygen-carrying chemicals prior to input. If less than stoichiometric balance of oxygen is provided by the oxygen-carrying chemicals, air or oxygen may be injected via lance. Raw non-fuel inputs consist of oil shale, tar sands, crude oil, and/or hydrocarbonaceous materials, singly or in combinations. Also, pressurized nitrogen, hydrogen, carbon dioxide, nitrogen oxides, etc. may be fed by lance or through ports in the walls of the reaction chamber.

Treated fuel and raw-input piles are elongate briquettes, either ram driven smooth or threaded precast piles, or screw driven compacted particles. In the oxidation-pyrolysis chamber, the treated fuel burns like a highway flare, but at an exceedingly high combustion rate. The raw non-fuel input undergoes pyrolysis to form ash, oil vapor, organic and inorganic reaction products, and cracked oil fractions.

When fuel is intimate and stoichiometrically balanced with oxygen-carrying chemicals, so that additional gaseous oxygen is not required, it is possible to directly feed the treated fuel with the raw non-fuel input. In this input mode, the intimate fuel and chemical oxygen will burn completely, leaving little or no oxygen to react with the adjacent commonly-fed raw non-fuel reaction input.

The flue products are bled off under controlled conditions from the retort for recovery, as described in the previous text. A pressure-temperature monitored valve is used to control and maintain high pressure, temperature, reaction, and feed rates within the reaction chamber. Simple computer control readily lends itself to this application.

The hot ash is lock-discharged from the retort by positive feed auger or other suitable discharging means. The ash or slag enters a cooler where it may be mixed with oil shale for pyrolysis, or used to generate steam, or for some other useful purpose. The ash may then be leached to recover metal values and to produce oxygen-carrying chemicals. The oil recovered may be used as raw non-fuel reaction input to the high temperature and pressure retort, and cracked to its hydrocarbon fractions. Easily inserted and removed or replaced, the valve-containing spouts for slag and/or ash are included.

FIG. 4 shows one possible method of feeding piles into the high pressure chamber, a non-reversible, lock-escapement, solid injection system. A ram forces briquettes down a tube which ends at the reaction chamber. At the end of the ram's stroke, a lock-gate closes to prevent setback, and the ram withdraws to be recharged with one or more briquettes for another advance stroke. The use of precast threaded piles would be another means.

The escapement shown in FIG. 4 is also suitable for the outfeed of ash and/or slag, where sealing for the escapement is supplied in part by an ash trough above the escapement, whose resistance against chamber-pressure blowout is augmented by the use of segmented screws, valves, variable or fixed orifici, etc., as shown.

FIG. 5 shows an automatic breech-block mechanism. The pivotal breech-block or latch is hydraulically and/or spring loaded to lock the advanced briquettes when the ram is withdrawn. A cam lock may also be used, as shown.

Dependent upon the temperature and pressure used in pyrolysis, type of hydrocarbonaceous feedstock, infeed of spent flue gases, added or naturally occurring catalysts and oxygen present - synthetic natural gas (SNG), normal and cracked shale oil gases such as methane ($CH_4$) and hydrogen sulfide ($H_2S$), and synthesized products such as ammonia ($NH_3$), ammonium hydroxide ($NH_4OH$), hydroxylamine ($NH_2OH$), hydrazine ($N_2H_4$) and urea ($CO(NH_2)_2$) are produced. Cyanamide ($H_2NCN$) and guanidine ($HNC(NH_2)_2$) may also be produced in an $N_2CO_2$ etc. atmosphere during pyrolysis.

In one mode, the foregoing ammonia and derivative products may also be produced in the oxidizing zone, when any formed reducing gases such as watergas, methane, etc., are consumed within the oxidizing-zone envelope by a net small excess of oxygen.

In the indirect mode, the high rate of combustion produces equally high heat for high-rate pyrolysis and production of new and/or cracked products.

In the direct mode, the products of combustion join the products of pyrolysis in-chamber, producing a very high production rate of all products.

Infeed of fuel and hydrocarbonaceous feedstock, and solid inputs are precast or extruded, elongate members for pressure feeding and maintaining pressure and temperature integrity of the chamber. All gases and liquids are pumped into the chambers at above chamber pressure, all gases and vapor-phase products of combustion, pyrolysis, cracking, and synthesis are bled from the chambers by controlled valve-type devices. All ash and solid products are removed by pressure extrusion such as can be provided by excapement chambers or locks or long rotating screw outfeed which is resistive and maintains high temperature pressure integrity.

EXAMPLE 1

One unit by weight of oil shale is crushed and ground to a minus 60 mesh and is mixed with oxygen carrying chemicals such as the chlorates or perchlorates referred to in my earlier patents. Ten percent of the stoichiometric proportion of oxygen required for combustion is furnished in the mixing state, in the wet form as described in the patents. Following drying and impact milling as shown in FIG. 1, the prepared or oxidized shale is burned rapidly with 90% of the stoichiometric amount of oxygen being provided from the air at atmospheric pressure. This is carried out in the "oxidizing zone"— the kiln, boiler or furnace shown in FIG. 1.

The ash is passed to the scrubber, the second desulfurizer and the precipitator. The vapor phase metal compounds are fed to the first desulfurizer and to the bag house. Products not retained in the bag are passed on as shown in FIG. 1.

The first desulfurizer is also fed products reaching the condensor and extractor from the pyrolysis vessel. The vessel is the kiln, furnace or the like wherein conventional shale pyrolysis occurs. Ashes collected as shown in C supplemented with ashes from the pyrolysis vessel were smelted and refined as taught in the patents referred to above. The ashes from the shale pyrolysis vessel were extracted and precipitated, and the hydroxides therefrom were furnished to the chemical generation area. This is where the oxidizing chemical solutions are produced, as shown in FIG. 1. The hot ashes from the oxidizing zone were cooled, and as supplemented by the liquid from the scrubber and second desulfurizer, were also converted to hydroxides. Extra heat taken from the oxidizing zone generates electricity, some of which was used to oxidize the hydroxides for the production of chlorates, perchlorates, nitrates, nitrites and the like as taught in the patents referred to above.

The portion of the oil shale fed directly to the pyrolysis vessel was treated by the known method of crushing and heating. The vapor emanating from the pyrolysis zone gave refinable oil products, as shown. The ash portion was also able to be treated for recovery of a small amount of metal values therefrom.

This process demonstrated the possibility of recovering metal values from a portion of shale intended for this purpose, the simultaneous recovery of incidental metal values from shale pyrolysis, and the use of the heat generated in primary metal recovery to lower the cost, or increase the effectiveness of pyrolysis being carried on by known methods.

In the indirect pyrolysis method of FIG. 1, a steel barrier was used to separate the oxidizing zone, that is, the portion of the apparatus containing a burner for combustion of the treated shale (in the manner of burning powdered coal) from the pyrolysis zone, wherein the shale was pyrolyzed by known methods. Because of the physical barrier, this method is referred to as the "indirect" retort method. The heat from the oxidation zone can furnish all or only some of the pyrolysis heat.

Analysis showed that for each pound of shale which was burned in the oxidizing zone, sufficient heat was provided to pyrolyze nine pounds of oil shale. Where the shale used was Saskatchewan oil shale, 0.03 to 0.04 Troy ounce of gold were recovered per ton of input shale. Other precious and valuable metals were also recovered, and it is calculated that approximately $15.00 per ton of metal and oil values combined may be recovered from each ton of shale treated by this process.

According to the invention, at least part of the basic ash which is produced, including calcium oxide, calcium hydroxide, etc., is used to desulfurize the products trapped in the first desulfurizer, in the cyclones and in the second the scrubber-desulfurizer. The products of the ash and the sulfur-containing products are leached to obtain hydroxides for chemical production and also for lye and alumina as well as gypsum, which is made in the reaction between the sulfur oxides contained in the flue gases and the calcium component of the calcium hydroxide.

The vapor phase metals obtained at these fairly high temperatures remain gas-borne in the flue, and are thus not found in the solid state for removal in the steps shown between Ⓔ and Ⓒ in FIG. 1. The desulfurized flue gases are directed to the pyrolysis retort after preheating. These flue gases contain nitrogen and carbon dioxide and can thus furnish a nonoxidizing atmosphere to the pyrolysis zone.

If pyrolysis of the shale is carried out at 800°–1000° F., the shale from which the oil is being extracted will not have the metal compounds volatilized from this vapor, and these compounds can be recovered from the ash resulting from pyrolysis. This ash is leached and extracted, and the metal values therein may be recovered by precipitation, smelting and refining.

The liquid from the scrubber shown in FIG. 1 will contain nitric and hydrochloric acid but no measurable amount of sulfuric acid, provided that an alkali or alkaline metal earth ash desulfurizer is used in the cyclones to remove the sulfur oxides from the oxidation zone flue products. The calcium sulfate (gypsum) is made in this phase.

In alkali and alkaline earth metal oxides are removed from the high pH ash by water washing to produce soluble alkaline metal hydroxides. When chlorine-containing scrubber liquids are used to wash the alkaline oxides referred to above, hypochlorites are produced as follows: See Examples 7, 11, 12. Nitrates and nitrites may also be produced as follows: See Example 6. These alkali hypochlorites, nitrites and nitrates may be placed in electrolytic cells and electrolytically oxidized to produce chlorates, perchlorates and nitrates in saturated solutions, as taught in the patents referred to above. These chlorates, perchlorates and nitrates are the oxidizing chemicals which are mixed with the crushed and ground oil shale, coal shale or the like as referred to in the beginning of this example.

EXAMPLE 2

The process was carried out as defined in Example 1, except that the same kiln or furnace was used to comprise both the oxidizing or combustion zone for the previously treated shale and the pyrolysis zone for the oil shale. The same types of products were recovered with the same results. Accordingly it has been determined that the pyrolysis of a certain amount of shale may be made carried out in the same reaction vessel in which combustion of the shale treated with the oxidizing agent takes place. The approximate product ratio 5 of Example 1 were maintained; the combustion of one pound of treated shale creates heat sufficient to pyrolyze 9 pounds of shale.

EXAMPLE 3

A process similar to that described in Example 1 was carried out, except that about 25% of the shale was treated with the oxidizing solutions in the wet state before impact milling and burning in the presence of atmospheric oxygen. The remainder, or about 75% of the oxygen used, was supplied in the form of atmospheric oxygen. In this connection, it will be noted that the air or other form of gas phase oxygen supplied to the combustion zone is perferably heated before being directed to the oxidizing zone to increase the oxidation rate.

EXAMPLE 4

A method as described in Example 3 was carried out except that 90% of the stoichiometric amount of oxygen used in the process was furnished by premixing the shale with the oxygen-bearing chemicals referred to in the patents described above. The remaining 10% of the oxygen was furnished by direct contact with air.

The process of Examples 3 and 4 produced products of approximately the same quality and yield; however, the process operates at less cost when smaller amounts of oxidizing chemicals are used in the premixing or pre-treatment oxidizing step. Accordingly, depending on the starting material and on conditions of the process, a greater or lesser amount of oxidizing chemicals may be used without loss of success.

EXAMPLE 5

A process as set forth in any of the foregoing examples was used, except that raw materials used was oil shale which had already been treated by conventional pyrolysis methods. This shale contained less oil but the raw material, minus the oil which had been extracted therefrom, was suitable for treatment with the oxidizing chemicals in the wet state. The milling, oxidizing and ultimate product recovery were carried out as described in Examples 1–4. This demonstrated the use of pyrolyzed shale residue as a starting material.

The formation of a so-called particulate plasma during the oxidizing steps, or in the steps of making the chemicals for use in the oxidation steps, is the same as, and the equipment is the same as, those described in the patents referred to above.

In reactions carried out with reference to the foregoing Examples 1–5, nitrogen-containing products such as ammonia, hydrazine, hydroxylamine and the like can be recovered from the oxidizing or combustion zone; however, obtaining these nitrogen-containing products requires the presence of high pressures such as those typically found in a calorimeter bomb, or the like, inasmuch as these products cannot be formed from nitrogen at atmospheric pressure.

EXAMPLE 6

Chlorine, the oxides of nitrogen and traces of ammonia were found to form in combustion, producing HCl and $HNO_3$ and $NH_4OH$ in the scrubbers.

The nitrates and nitrites formed in combustion entered the ionized scrubber liquid.
Typically:

$N_2O + 6OH^- \rightarrow 2NO_2^- + 3H_2O$ $NO + 2OH^- \rightarrow NO_2^- + H_2O$ $NO_2^- + OH^- \rightarrow HNO_3$, producing nitric acid. Chlorine formed in combustion produced hydrochloric acid:
Typically:

$Cl_2 + 2H_2O \rightarrow 2HCl + 2OH^-$

Some high temperature atmospheric ammonia formed:

Heat $+ N_2 + 3H_2 \rightarrow 2NH_3$ (weak reaction at 1 bar)

Ammonia in the scrubbers formed ammonium nitrate.
Typically:

$NH_3 + H_2O \rightarrow NH_4OH$ $NH_4OH + HNO_3 \rightarrow NH_4NO_3 + H_2O$

The ammonium nitrate thus formed is one of our oxygen-carrying chemicals.

EXAMPLE 7

Carbonaceous combustion ash and hydrocarbonaceous pyrolysis ash residues were found to have high alkaline pH in water. The ash was leached with water and the alkali and alkaline-earth soluble oxides produced hydroxides.
Typically:
$$Na_2O + H_2O \rightarrow 2NaOH$$
Salt was added to these hydroxides both with and without ash and placed into an open electrolytic cell.
Typically:
$$Cl_2 + 2OH^- \rightarrow Cl^- + ClO^- + H_2O; \text{ and}$$
$$3ClO^- \rightarrow 2Cl^- + ClO_3^-,$$
forming the chlorate oxygen-carrying chemical. Further electrolysis typically produced:
$$4 ClO_3^- \rightarrow 3ClO_4^- + Cl^-,$$
forming another oxygen-carrying chemical.

The leached ash was found to be neutral and ecologically safe. Some of the ash dissolved by electrolysis was consumed.

EXAMPLE 8

Retort products synthesis gas is produced in the oxidizing zone only if there is less than stoichiometric oxygen for total combustion; an excess of oxygen produces no reducing agents out of the oxidation zone. At high temperatures (above pyrolysis temperature) SNG can and does synthesize from fixed carbon in the shale.
$$C + O_2 \rightarrow CO_2$$
$$C + CO_2 \rightarrow 2CO$$
$$C + H_2O \rightarrow CO + H_2$$
$$C + 2H_2 \rightarrow CO_2 + H_2$$
Oil is also cracked to form $H_2$ and $CH_4$ as well as other light hydrocarbons.

EXAMPLE 9

Retort products in the high pressure and temperature retort C, $O_2$, $H_2$, $N_2$, $CO_2$ $H_2O$ combine to form $NH_3$ and, by further synthesis, all of these to:
hydroxylamine ($NH_2OH$);
hydrazine ($N_2H_4$);
urea ($CO(NH_2)_2$);
cyanamide ($H_2NCN$);
quanidine ($HNC(NH_2)_2$); etc.
For instance,
$$CO_2 + 2NH_3 + \text{heat and pressure} \rightarrow NH_2CONH_2 + H_2O \text{ (urea + water)}$$

EXAMPLE 10

The high pH alkaline ash was washed with the low pH scrubber liquids.
Typically:
$$2HNO_3 + Na_2O \rightarrow 2NaNO_3 + H_2O.$$
($NaNO_3$ is one of our oxygen-carrying chemicals),
And:
$$2HCl + H_2O + Na_2O \rightarrow 2NaClO + H_2.$$
The liquids were then placed into an electrolytic cell with salt (NaCl) addition, producing chlorates and perchlorates as before.

EXAMPLE 11

Electrolysis of the hydroxedes and hypochlorites with or without ash produced at least: $Ca(ClO_3)_2$, $KClO_3$, $NaClO_3$, $TlClO_3$, $NH_4ClO_3$, $NH_4ClO_4$, $RbClO_3$ and residual, or by electrolysis: $NH_4NO_3$, $NaNO_3$, etc. All of these were found to be excellent oxygen-carrying chemicals, and were found to release oxygen copiously, and, with high heat some chlorine which reacted with some metals to produce metal chlorides into vapor-phase for recovery. Oxides, sulfides, and other metal compounds also formed and were recovered from vapor-phase.

EXAMPLE 12

Chlorine gas was bubbled through the leach liquid with and without ash,
Typically:
$$Cl_2 + 2OH^- \rightarrow Cl^- + ClO^- + H_2O$$

EXAMPLE 13

Briquetting, extrusion and obturation tests were made on treated and untreated oil shale, carbonaceous ore, lignite, coal, etc. All were found soft, extrudable, self-lubricating, impermeable and capable of extrusion under the high temperature and pressure conditions imposed by this invention.

Indeed, cylinder friction occasioned by increasing diameter toward the combustion chambers, could sustain hydrostatic setback forces of over 300 bar. Variable diameter proved equally good, for example, a tube which repeatedly decreases gradually in diameter, then abruptly returns to its maximum diamter, like a series of nesting cones pointed toward the combustion chamber, presenting their notched edges to pressure within the combustion chamber, thus preventing setback of feed.

EXAMPLE 14

At only moderately high retort temperatures ash is a molten slag. Molten slag was found to remain fluid merely by insulating the drain pipe. When mixed with oil shale, the molten slag transferred its heat to the oil shale and became solid and granular. Steam will also make the molten slat stringy and granular.

Preferred embodiments of the invention having been described by way of examples, it is anticipated that modifications and changes to the methods shown may be made without departing from the spirit of the invention or the scope of the appended claims.

What is claimed is:

1. A method of treating solid materials recovered by mining, said solid mined materials including oil shale, low grade coal, and mixtures thereof, said mined materials being comprised of a first, refractory, inorganic ore gangue portion, a second, hydrocarbon portion and a third, composite organic portion, said third portion containing recoverable precious and semi-precious metal values, said method being adapted to recover said metal values from said third portion and to create heat by combustion of at least parts of said second and third portions, said method comprising physically reducing the particle size of said mined material, separating said third composite organic portion from said gangue portion to form a concentrate of said third, metal-containing organic material, treating said metal-containing organic concentrate portion with both an aqueous solution of a strong oxidizing agent and gas phase oxygen in a combined amount sufficient to supply the stoichiometric amount of oxygen required to fully oxidize said composite material, thereby producing a treated composite organic concentrate material, heating said treated composite organic material until said material ignites, and allowing complete combustion of said treated composite organic material and a portion of said hydrocarbon material recovering the metal and metal oxides resulting from said combustion, and generating significant useable heat from the process of combustion of said second and third materials.

2. A method as defined in claim 1 in which said composite material is oil shale, in which said oil shale is divided into first and second portions, in which said first portion is treated as defined in claim 1 and in which said second portion is pyrolyzed using at least a portion of said additional heat generated in said process of obtaining metals, metal compounds and heat from said composite material.

3. A method as defined in claim 1 wherein said aqueous solution of said strong oxidizing agent comprises about 10% of said stoichiometric amount of oxygen.

4. A method as defined in claim 1 wherein said aqueous solution of said strong oxidizing agent comprises about 25% to 50% of said stoichiometric amount of oxgyen.

5. A method as defined in claim 1 in which said additional heat is used to raise the temperature of said gas phase oxygen, and in which gas phase oxygen is supplied to said treated concentrate at an elevated temperature to increase the combustion rate thereof.

6. A method as defined in claim 1 wherein said third portion of said mined materials further includes base metals and metal oxides, said process including a further step of electrolytically treating said base metals and metal oxides so as to form a strong oxidizing agent component of said oxidizing solution.

7. A method as defined in claim 1 wherein said hydrocarbon portion and said composite organic portion of said mined materials includes sulfur, wherein said combustion of said hydrocarbon portion and said composite organic portion creates oxides of sulfur, said process including a further step of reacting said oxides of sulfur with alkaline metal oxides and hydroxides to remove said sulfur oxides by the creation of substantially neutral salts.

8. A method as defined in claim 1 wherein the combustion products of said second and third portions are treated so as to remove therefrom substantially all products of combustion except nitrogen and carbon dioxides, whereby said nitrogen and said carbon dioxides create an atmosphere which may be used to provide a non-oxidizing atmosphere for the removal of oil from said shale by pyrolysis.

9. A method as defined in claim 1 wherein said composite organic portion comprises the residue of oil shale material which has been treated for removal of oil therefrom by pyrolysis.

* * * * *

UNITED STATES PATENT AND TRADEMARK OFFICE
CERTIFICATE OF CORRECTION

PATENT NO. : 4,177,064
DATED : Dec. 4, 1979
INVENTOR(S) : Fritz W. Wanzenberg et al.

It is certified that error appears in the above—identified patent and that said Letters Patent is hereby corrected as shown below:

IN THE SPECIFICATION:

Column 7, line 66, "perferably" should be -- preferably -- ;

Column 9, line 45, "quanidine" should be -- guanidine -- ;

Column 9, line 62, "hydroxedes" should be -- hydroxides --;

IN THE CLAIMS:

Column 10, line 68, after "material", insert -- , --.

Signed and Sealed this

Twenty-second Day of July 1980

[SEAL]

Attest:

SIDNEY A. DIAMOND

*Attesting Officer*   *Commissioner of Patents and Trademarks*